United States Patent

Bertram et al.

[11] Patent Number: 5,818,446
[45] Date of Patent: Oct. 6, 1998

[54] SYSTEM FOR CHANGING USER INTERFACES BASED ON DISPLAY DATA CONTENT

[75] Inventors: Randal Lee Bertram, Raleigh; Peter James Brittenham, Apex; Mathew James Brozowski, Durham, all of N.C.

[73] Assignee: International Business Machines Corporation, Armonk, N.Y.

[21] Appl. No.: 751,831

[22] Filed: Nov. 18, 1996

[51] Int. Cl.⁶ .................................................. G06F 3/00
[52] U.S. Cl. .................................. 345/334; 345/329
[58] Field of Search ................................. 345/326–358

[56] References Cited

U.S. PATENT DOCUMENTS

| | | | |
|---|---|---|---|
| 5,072,412 | 12/1991 | Henderson, Jr. et al. | 345/340 |
| 5,596,702 | 1/1997 | Stucka et al. | 345/340 |
| 5,600,776 | 2/1997 | Johnson et al. | 345/329 |
| 5,600,778 | 2/1997 | Swanson et al. | 345/333 |
| 5,689,664 | 11/1997 | Narayanan et al. | 345/340 |

OTHER PUBLICATIONS

Simpson, "Mastering Wordperfect 5.1 & 5.2 for Windows", Sybex, pp. 58–59, 67–71, 449–467, 1993.

*Primary Examiner*—John E. Breene
*Attorney, Agent, or Firm*—Edward H. Duffield

[57] ABSTRACT

The computer is enhanced to include software processes for detecting the contents of data to be displayed and, responsive thereto, for changing the user interface selected for display and use. These processes determine which of a plurality of possible user interfaces shall be loaded into the computer memory for employment on the display for user interaction therewith so that, for example, functionally rich user interfaces will be employed for adult use of a given data load, but simplified user interfaces may be employed for the same data when a child desires to use the system. The entire user interface is changed based on data type or content as compared with a register of desired user interfaces for differing types or contents of data to be displayed.

21 Claims, 7 Drawing Sheets

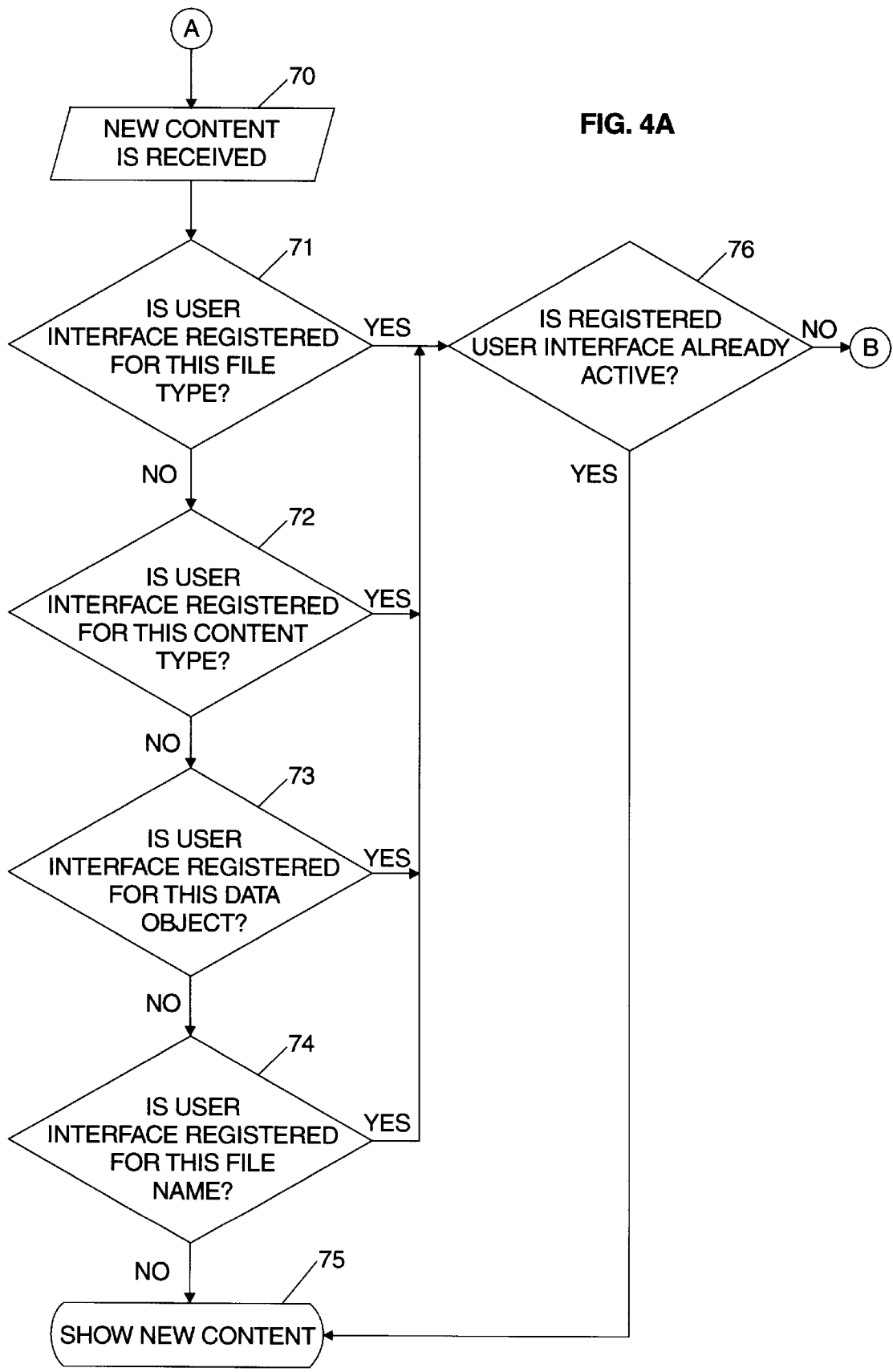

5,818,446

SYSTEM FOR CHANGING USER INTERFACES BASED ON DISPLAY DATA CONTENT

FIELD OF THE INVENTION

This invention relates generally to computers and computer systems, and more specifically to the user interface presentation control which arranges and displays and allows for interaction with a user the icons and controls for selecting the various functions, facilities and applications that are made available to the user through a user interface display.

PRIOR ART

User interfaces are common place and are used on virtually every computer system known today. A wide variety of user interface appearances and functional controls also exist. Many users are familiar with the well-known Microsoft Corporation user interface presented by the Windows™ operating system, by the IBM Corporation's Presentation Manager™ user interface supported by the OS/2™ operating system, and with the Apple Computer Corporation's many familiar user interfaces, and the like. Indeed, user interfaces exist for terminals supported by mainframe applications, stand alone personal computers and work stations and hand held so called personal digital assistants and the like. In short, not only are many computer systems outfitted with their own unique user interfaces, but the user interfaces themselves are ubiquitous across many different computer systems. Indeed, some application programs have well-known user interfaces such as the Microsoft Word™ product, Lotus Corporation's 1-2-3™ Spreadsheet and numerous independent software suppliers products for an infinite array of applications, each of which tend to have their own unique user interface and presentation which is particularly suited either to the operating system or to the tasks and functions of an application program which is to be operated on the computer by the user.

User interfaces also exist for a variety of well-known Internet retrieval and display programs, called browsers, that present data in a display area on the computer display screen that has been retrieved from the World Wide Web. Browser interfaces, too, also come in a wide variety of functional and appearance embodiments and differ from one supplier to the next. Each browser typically has only one user interface, that which was designed by its producer for use by those who employ the browser. Typically, a browser interface may be customized to a certain degree but cannot be replaced completely. For example, a browser may have a menu bar or tool bar whose contents can be changed, removed or arranged differently for customization. Also, some browser user interface components can be customized by referencing new executable code. Again, however, the user cannot replace the entire user interface. The basic structure of the user interface remains the same, since only specific functions can be customized.

The problem that is encountered with browsers, with stand alone personal computers running various applications, with work stations in a host or client server arrangement and with personal digital devices is that the interface displayed is normally intended for a specific type of user in a specific type of situation for a specific type of data. This may be inappropriate for another user or for another specific situation in a number of ways. A standard user interface may often require skills that some users do not possess, such as familiarity with pull-down menus and the like. In addition, a standard user interface usually provides functionality which may not be appropriate for a given user in a given application task, such as the ability of the interface to access any Universal Resource Locator (URL) by simply allowing a user to type it in an entry space. Again, a standard user interface may not provide all the capabilities that are needed in a particular context, such as the ability to load multiple simultaneously active URL's, a feature of our commonly assigned copending application Ser. No. 08/751,830 filed on even date herewith. Also, a standard user interface may not have the look and feel that a given application provider or service provider prefers in order to achieve distinction from competitors.

OBJECT OF THE INVENTION

In light of the foregoing known difficulties with standard user interfaces utilized in computer systems of any known sort, it is an object of the present invention to provide an improved computer system having easily changeable user interface capabilities that allow automatic or selective modification of the user interface to suit the preference of a user.

SUMMARY OF INVENTION

The foregoing and still other objects of the invention which are not specifically enumerated, have been met in the present invention by enhancing the computer system to include software means for detecting that a user control change is desired, means for determining which of a plurality of possible user interface controls is requested, and means for loading the desired user interface controls into the computers memory for use by the processor in displaying data and control indicators on the display of the computer for the user to interact with.

BRIEF DESCRIPTION OF DRAWINGS

The foregoing objects and still others which are not specifically enumerated are met in a preferred embodiment of the invention which will be further described in detail with reference to the drawings in which.

DETAILED DESCRIPTION OF PREFERRED EMBODIMENT OF THE INVENTION

Figure 1:
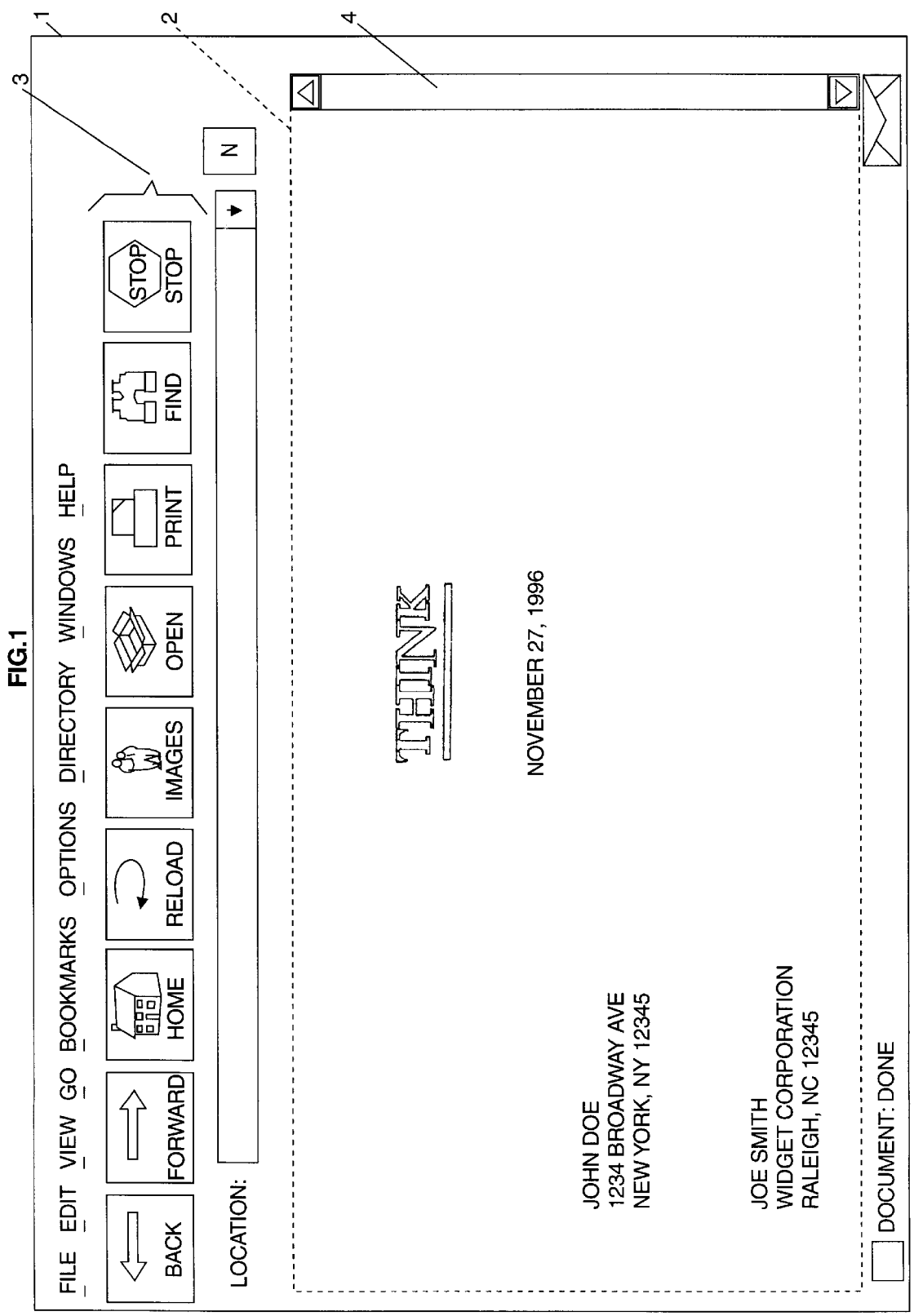
FIG. 1 illustrates the typical user interface display in a computer system running a network browser application program.

The invention will be described in detail with reference to a preferred embodiment which features a web browser implementation of a computer system having changeable user interfaces in accordance with the invention herein. At the outset, it should be clearly understood that while the invention will be illustrated and described with reference to a browser application, the control procedures for detecting a request for a user interface display change and for the determining which interface should be selected and for controlling, loading and installation of the requested new user interface as an element in the display output from the computer system are entirely separate from the content being displayed, i.e. the information or data which will be displayed within the viewing window which is affected or operated upon by the users interaction with the user interface controls also present on the screen of the display. Indeed, the invention may be practiced in stand alone computer systems by embodying the appropriate control codes for the control processes illustrated for this invention in the operating system of any computer, in an application program running in the computer, in the display presentation control code or program associated with the computer system or even downloaded from the World Wide Web for use at a workstation in a network, client-server or host based environment with equal ease. Therefore, while the invention will be illustrated as a preferred embodiment in a browser environment, it is directly applicable to any of the aforementioned computer system environments as well.

In illustrating the invention with respect to an implementation in a web browser application, a few terms will be defined at the outset. A Universal Resource Locator (URL) is a well-known element widely used in the communications systems making up the World Wide Web and it is used as an identifier to point to a specific site or location of a computer and its contents on the web. Typically, a given URL may point to a Hyper Text Markup Language (HTML) encoded page of data but it might point to a text file, a spreadsheet or even a game. The browser application is an application program that requests receives and processes and presents data that is pointed to by URLs specified by a user using the user interface. The browser application normally selects the appropriate method to process each type of data that is received and contains, or has access to an HTML renderer for displaying an HTML page of data, a spreadsheet application program resident in the computer system, (if spreadsheet data is to be presented) and the like. Furthermore, a browser normally moves at a users direction from one specified URL content to another. For example, if a user selects a hyperlink in an HTML page, the browser will access the new URL location pointed to by the hyperlink.

Each received URL has data contents that are processed and presented by the browser either through use of its own facilities or through use of facilities present through the operating system where it is running or through other applications provided through the operating system. The browser typically has a direct link between its own user interface and the content being displayed within the display area shown on the computer screen in conjunction with the user interface controls and functional display elements. The user interface is typically a static array of functionally selectable icons, scrollbars, typing fields, buttons and the like display that engage display and data management control functions at the request of the user.

FIG. 1 shows a typical user interface for a typical kind of browser application program. Browser applications such as the Netscape Corporation's Navigator™ or the IBM Corporation's Web Explorer™ are some well know examples of browsers in which the preferred embodiment of the present invention may be employed.

Figure 5:
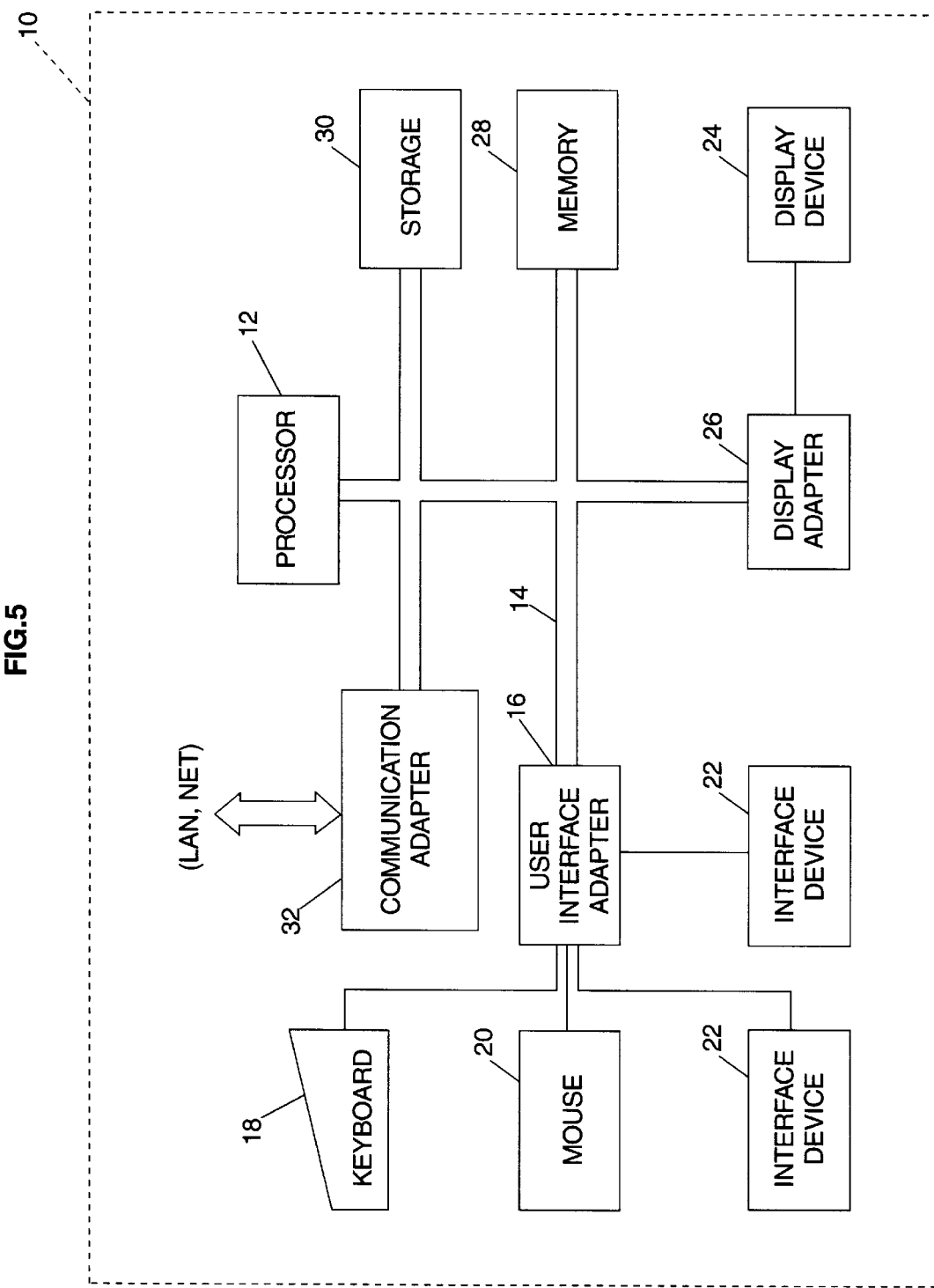
FIG. 5 illustrates the primary components of a typical personal computer, work station or network computer among others in which the present invention may be practiced.

As noted above, the invention is not limited, however to implementation in a single application program such as a browser, but may be implemented in a workstation or personal computer or in a host supported remote terminal, in a client server environment or the like. Turning briefly to FIG. 5, FIG. 5 illustrates a representative workstation or personal computer hardware environment in which the present invention may be practiced. As shown in FIG. 5, such an environment comprises a representative single user workstation 10, such as a personal computer, workstation, or network computer, which includes memory and related peripheral devices. The workstation 10 may include a microprocessor 12 and a bus 14, which is employed to connect and enable communication between the microprocessor 12 and the memory and other components of the workstation 10 in accordance with well known techniques. A workstation, network computer or personal computer 10 typically will include a user interface adapter 16 for connecting the microprocessor 12 via bus 14 to one or more of the interface devices. Such devices are well-known and include a keyboard 18, a mouse or other selection cursor device 20, and/or other interface devices 22, which could be any other kind, such as a touch sensitive screen, digitized entry pad, voice recognition apparatus and the like. Bus 14 also connects a display device 24, such as an LCD screen or monitor, to the microprocessor 12 via a display adapter 26. Bus 14 also connects microprocessor 12 to memory 28 and to permanent storage 30, which can include a hard drive, tape, disk, etc. Workstation 10 communicates via a communications adapter 32 to a communications network, and thence to other computers or networks of computers. Workstation 10 may be associated with such other computers in a local area network (LAN) or wide area network (WAN), or the workstation 10 can be a client in a client/server arrangement with some other computer in the network. Similarly, as has been mentioned above, the workstation 10 can be a network computer, which might not require the hard drive or permanent storage or full operating system that is conventionally found in most computer workstations and personal computers.

Figure 6:
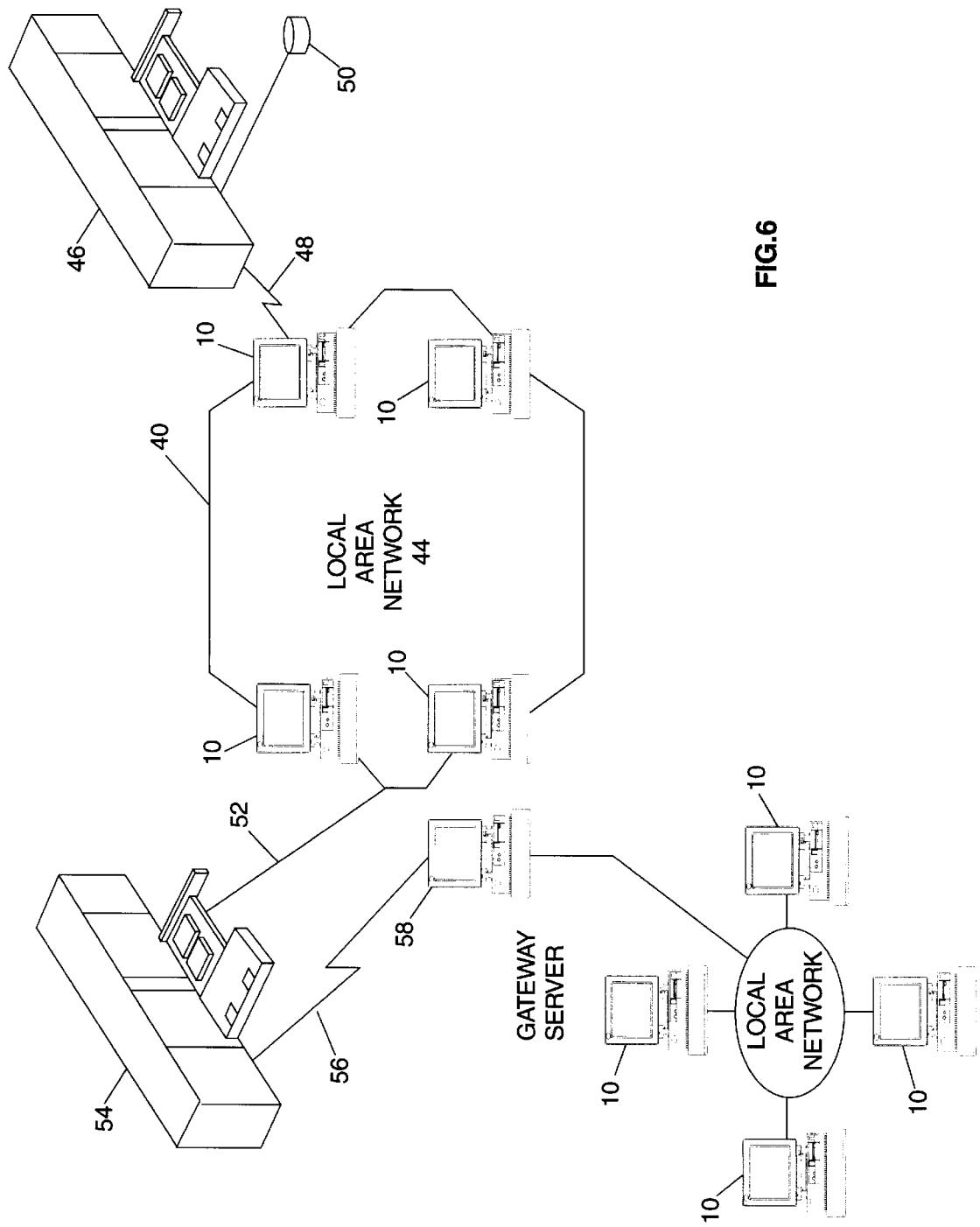
FIG. 6 schematically illustrates a data communications and computer network of the sort in which the invention may be practiced.

FIG. 6 illustrates a data processing network 40. The data processing network 40 includes a plurality of individual networks including the LANs 42 and 44, each of which includes a plurality of individual workstations 10. Alternatively, as will be appreciated by those of skill in the art, an individual LAN 42 or 44 may comprise a number of intelligent workstations or network computers coupled to a host processor. Multiple mainframe computers such as computer 46 may be connected to a LAN by means of communication links 48 as shown in FIG. 6. The mainframe computer 46 may also be coupled to a storage device 50 which may serve as a remote central storage for a LAN 44 and the LAN may be coupled to a communications link 52 through some subsystem control such as controller 54 and communications link 56 to a gateway server 58 for eventual access to other local area networks and workstations. The gateway server is preferably an individual computer or intelligent workstation and serves to link LAN 42 in FIG. 6 to LAN 44. Those skilled in the art will readily appreciate that the mainframe computer 46 may be located at a great geographic distance from the LAN 44 which in turn may be located a substantial distance from the LAN 42. A mainframe computer 46 might be located in New York, for example, while the LAN 44 might be located in Texas and LAN 42 might be located in North Carolina.

The present invention is typically embodied as software programming code which may be stored in permanent storage of some type such as the permanent storage 30 of the workstation 10. In a client server environment, however, such software programming code could be stored with the storage associated with a server such as storage 50 associated with computer 46 operating as a server as shown in FIG. 6. The software programming code in which the invention is embodied can itself be implemented on any of a variety of known media for use with a data processing system such as a floppy diskette, cassette tape, hard drive or CD ROM. The code may be distributed on such media or distributed to users from the memory or storage of one computer system over a communications network of any given type to other computer systems for use by users of such systems. The techniques and method of embodying software program code on physical media and/or for distributing or embodying the code via networks are well known and will not be further discussed herein.

Returning to FIG. 1, a typical browser interface together with some representative data displayed from a URL is shown. A user will normally employ the user interface to browse all the data content received from a URL request made to the World Wide Web. Note however that the user must be familiar with the operating system on which the browser is running, such as Windows™ or OS/2™, because the browser makes use of pull down menus, control buttons, navigational arrows and other devices specific to an operating system in which it runs.

Often, data content may be intended for a specific type of user or a specific situation in which the standard browser user interface shown in FIG. 1 may be inappropriate for the following reasons. First, a standard browser user interface may often require skills that some users simply do not possess such as familiarity with pull down menus, file and edit functions various options available and the like. Additionally, a standard browser user interface usually provides functionality that may not be appropriate for a given user such as providing the ability to access any URL simply by typing it in. In addition, a standard browser user interface may not provide all the capabilities needed in a particular context, such as the ability to load multiple URLs simultaneously as addressed in our own aforementioned copending, commonly assigned application. Also, a standard browser user interface may not have the look and feel that a service provider for access to the net or who provides URL content desires to achieve distinction from their competitors.

These difficulties with standard or fixed user interfaces, while discussed in terms of a browser, are equally applicable to the user interfaces presented by operating systems for the presentation management display, remote located terminals supported by host or client servers and the like. Continuing, however, with a web browser user interface discussion, the browser user interface may be totally inadequate in many ways. For example, a preschool child may browse a few web pages that are suitable for young children using a browser. The standard browser user interface is difficult to understand or use due to number of choices and complexity of functions and logical inter relationships that are indicated and because of the dependency upon the use of written text instead of, for example, pictures. The user of an information kiosk in a shopping mall may use web pages viewed by a browser and showing a map of the mall and information about the various stores. However, the typical kiosk user should not be enabled to access the World Wide Web simply by typing in a URL at the kiosk but should be able access links in the self contained kiosk system which may be hyper links to the World Wide Web. Additionally, such a kiosk interface user may not be accustomed to computer user interfaces at all, so navigational control icons and functions should appear on a kiosk screen either in a different depiction or not all. In the same environment, however, kiosk administrative and support personnel will need access to more functions and they may need to be able to turn the kiosk into a full function web browser in order to perform diagnostics to update information links, or the like. As yet another example, a small company may own several web browser equipped terminals, but some employees may not be experienced computer users and may prefer less complexity while still others may prefer a complex browser user interface having advanced functions such as the ability to process multiple URLs at a single time. Still other employees may be less comfortable with advanced functions or do not need them for their jobs and may prefer a simpler user interface entirely, yet the two types of employees will often share and use the same terminals.

In light of these examples, a single user interface could not possibly meet all the demands and needs of all users: witness the vast multiplicity of unique user interfaces that are presented by a variety of application programs, operating systems, browser environments and the like. There is a need to be able to switch between user interfaces at the preference of the user or when the data being displayed to a user changes in such a fashion that a different user interface would be better suited to the display and user needs. Changes between various user interfaces presented to the user should be quick, simple and easily selectable and automatic when possible.

In order to accomplish this, the user interface control display area and the content of data which is displayed on the display in conjunction with the user interface and controls must be functionally separated from one another to the extent that either can change without affecting the operation of the other. Our invention does precisely this. The user interface presented to the user can be changed and will interact with the data content displayed in the display area without affecting the visual presentation and basic conventional controls of the data content.

This invention requires a convention for separating the content data from the presentation and control methods by which the user will use the content data. For example, content in the HTML language can be processed on a wide variety of software platforms as long as the platforms provide the presentation and control methods required by the convention of the HTML content. Each platform must provide textual and graphical presentation to the user, and must provide software input devices such as scrollbars, typing fields, buttons, and the like so that the user can interact with the content. Each platform must further provide a means to move within and between the bodies of HTML content, such as hyperlinks and history lists. Though all platforms must by convention provide some basic presentation and control methods in order to process HTML content, the platforms may differ considerably in the appearance of the presentation and the operation of the controls. While one platform uses a button labelled "Back" to return to a previous HTML page, another platform might use a scrollbar to move backward multiple steps at a time, while another platform might respond to the spoken word "Back", while another platform might not support this function at all. The HTML content is isolated from these implementation details. This is one common convention for separation of content from presentation and control. HTML was designed to create this separation so that diverse platforms could view the same HTML content. In the prior art, there are many HTML viewers with distinctive presentation and control methods.

HTML is only one of many examples of the separation of the content from the user interface. As another example, database content might exist in a common file format. Several database file formats, such as dBASE™ or FoxPro™, are widely used in the computing industry. Various database applications can view the same database content, but each with an entirely different user interface.

Though separation of content and user interface is common, it is not common to switch to a different user interface based on a content transition. For instance, the existing HTML viewers do not change to a different set of presentation and control methods in response to the loading of a particular HTML page or type of page. The database applications do not change to a different style of user interface in response to viewing a particular record in the database. Each program that views content is designed for a specific set of users and situations.

This invention allows a content transition to trigger a switch to a different set of presentation and control methods, i.e., a different user interface. The user may have configured which user interface is selected by a particular content or type of content. In addition, some types of content may require certain functions to be supported in the user interface, so that only a subset of available user interfaces are suitable for the content.

In the invention, any user interface is changed by simply removing the currently active user interface and control code being executed in the processor and replacing it with a new user interface and control code without affecting the data being displayed. The user interface can be switched automatically in response to the receipt of a communicated desire to change the interface based on data content or format or it can be switched by the specific request of the user.

Automated user interface changes are implemented in the invention by providing software routines to respond to changes in data content or format from a data source such as a host, a server or a received URL content from a browser. To enable this function, each user interface is registered with a user interface selection control facility provided by the invention which is configured to detect changes in received content which correlate with factors that are associated with given user interfaces.

There are at least four criteria for enabling registration of a given user interface with a selection control facility so that the browser or the user interface controls will be notified when the content of displayed data changes to something associated with another user interface than that presently being used. The user interface control facility of the invention detects the occurrence of an event, or the receipt of data from a source, or content therein, for which a change in user interface is indicated as being desired or preferred. For example, a URL source filename can be associated with a specific user interface. This can be used to associate a user's HTML homepage with the preferred user interface defined by that user. Anytime the user's HTML page is selected, the users preferred user interface will be displayed at the same time a data content of the HTML homepage is displayed. Notification via the user interface control facility occurs whenever a URL content with the registered source filename is requested or is received. The detection of the registered source filename acts as a signal or indicia to the control facility to change to the specified user interface definition.

Another indicia might be the source file type of the URL. The source file type is generally a file extension that exists in an URL identifier. For example, the URL http:// servername/file.html, has a file extension of html. This can be used to uniquely identify different types of files without the system having to know the exact contents of the file. Detection of a perceived desire or request to change the user interface will occur whenever an URL having a registered source file type is detected either at URL request or receipt.

Still another indicia or signal that can be used will be the content type in an URL. The content type is similar to a source file type, but is not dependent upon the file extension in the URL. The type of file is based solely on its on content. For example, consider the content type for a URL using its equivalent to the MIME type for the URL. A file that contains HTML content will have a content type of text/html, regardless of the name used to uniquely identify the URL. Detection of this condition will occur whenever a URL is requested that has the registered content type.

Yet another indicia that can be used to signal a requested change or a preferred user interface would be the system data object. Some computer systems provide a mechanism for translating URL data contents into data objects that can be understood by the system that requested the URL in the first place. For example, the content of a URL that contains HTML data can be translated into an HTML object. Such a data object would then be used by the computer system programs to display the HTML content in an appropriate format. Notification as used in the context of the present invention would thus occur whenever a new HTML data object is created.

In general there are at least three basic kinds of criteria or methods that can be used individually or together to register a user interface with the invention's user interface control facility to enable it to receive notification when there is a requested change in user interface due to content or user selection. First, the user can register a user interface that is to be associated with a specific URL or data content. Secondly, the content itself that was requested can be registered with its type for selecting a user interface that is the user's or data content provider's preferred user interface for the content. Thirdly, a user interface can be registered with the user interface control facility when it is loaded or preloaded.

As for user requested user interface changes, these can occur at anytime. Such a requested change does not have to coincide with a change in data content being presented. A user requested user interface change can be made while a request for content is pending in a browser or in a stand alone environment. User requested changes should be taken to override any automatically invoked user interface changes that are dependent upon data received. While there is no single required method for implementing user requested user interface changes, the method used should be consistent on all user interfaces. For example, a user requested interface change can be implemented using a visual component on the screen display itself which may even be part of another user interface such as a control button, or a hot key sequence which is logically and data dependent or upon selection with a cursor selection entry device such as a mouse button.

As set forth for the preferred embodiment of the invention, there is a sequence of functions that should be processed by the user interface control facility upon detection of an interface change request in order to insure that proper transition occurs from one user interface to another. The user interface transition is similar for both the automatic and for user requested user interface changes. The primary difference is that the automatic user interface change occurs in response to a request for data or receipt of data which are registered with the interface control according to criteria recognized by the control facility, whereas the user requested changes are independent of data requests or data receipts.

In the context of a browser implementation of the preferred embodiment, a URL request to the World Wide Web goes through a series of four different checks as it is being processed to determine whether a user interface is registered to receive notification based on the request. These correspond to the four criteria mentioned above that can be employed for registering a user interface control facility to receive notification of changes in content. These are the source filename, or the source filetype or the content type or the system data object type. When a user interface control facility receives notification of a change in content that is associated by registration with a given user interface, and if the user interface requested is not active, then the control submits a request to the required user interface to become the active user interface. This request will be processed when the control code in the user interface change facility indicates that a currently active user interface has reached a point in its execution where its operation may be suspended and returned to easily.

This will be described with greater detail in reference to FIG. 4 comprising

Figure 4B:
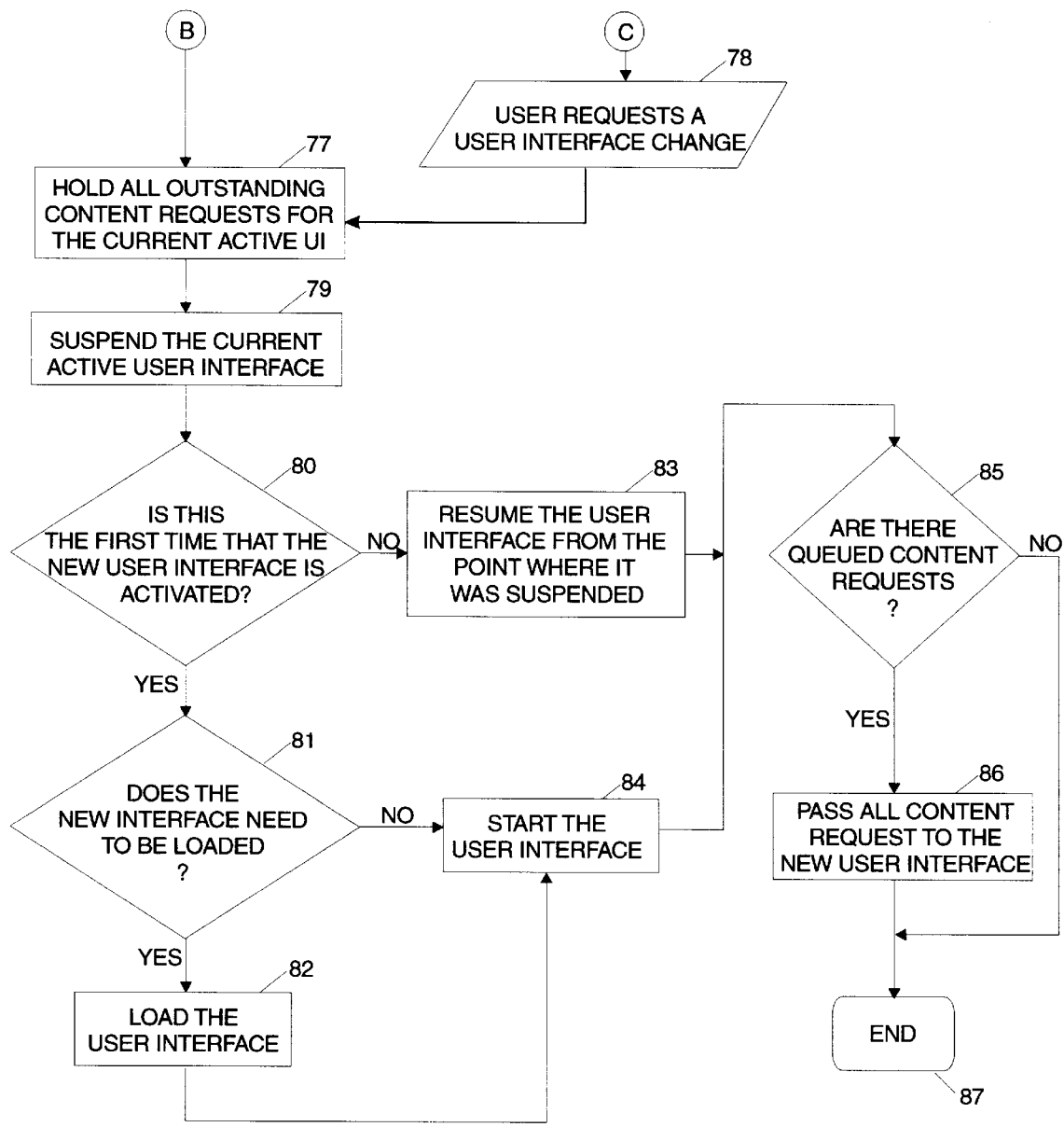
FIG. 4 consisting of FIGS. 4A and 4B schematically illustrates a procedural flow of a software process for implementing the preferred embodiment of the invention as a user interface change control detection and selection control means according to the invention.

FIG. 4A and 4B. There is a specific set of functions that must be processed whenever activating a new user interface is required. The sequence of these functions is important, since the currently active user interface should be suspended in a condition from which it can easily be later resumed. All of the outstanding requested content which may be pending URL requests for the currently active user interface should be held in a queue during the transition to the new user interface. After the new user interface is activated, the queued requests may be passed to the new user interface for display. Also, since all of the content requests will be saved, a history list will be constructed which may be passed to the new user interface if it requires a copy of the history list for its own control purposes such as is done in our aforementioned, copending, commonly assigned application.

The preferred embodiment of the invention will now be described in even greater detail with respect to the illustrative figures and flowcharts of its operation.

An assumed hypothetical example will be used as the setting for illustrating both the embodiment and its function and operation. In keeping with the browser implementation example that has been assumed herein, let us assume that two different network browser users consist of a parent and a child. Two user interfaces will also be presumed to exist. A standard browser user interface, having all the functions that are typical in a normal adult, text based Web browser and, a child level browser user interface, having only a few simple functions that are identified using pictorial or preschool graphics. These two examples will suffice to illustrate any of a variety of possible user interface changes as will be apparent to those of skill in the art, hence the multiple kinds of different adult user interfaces that might be invoked will not be described further.

Continuing with the example, we will assume that the parent has previously registered the child user interface with the preferred embodiment's interface control facility. If the parent registered the child user interface for a certain file which the child frequently browses, then an example file which the child browses may be identified by its URL in any of the files.

Figure 2:
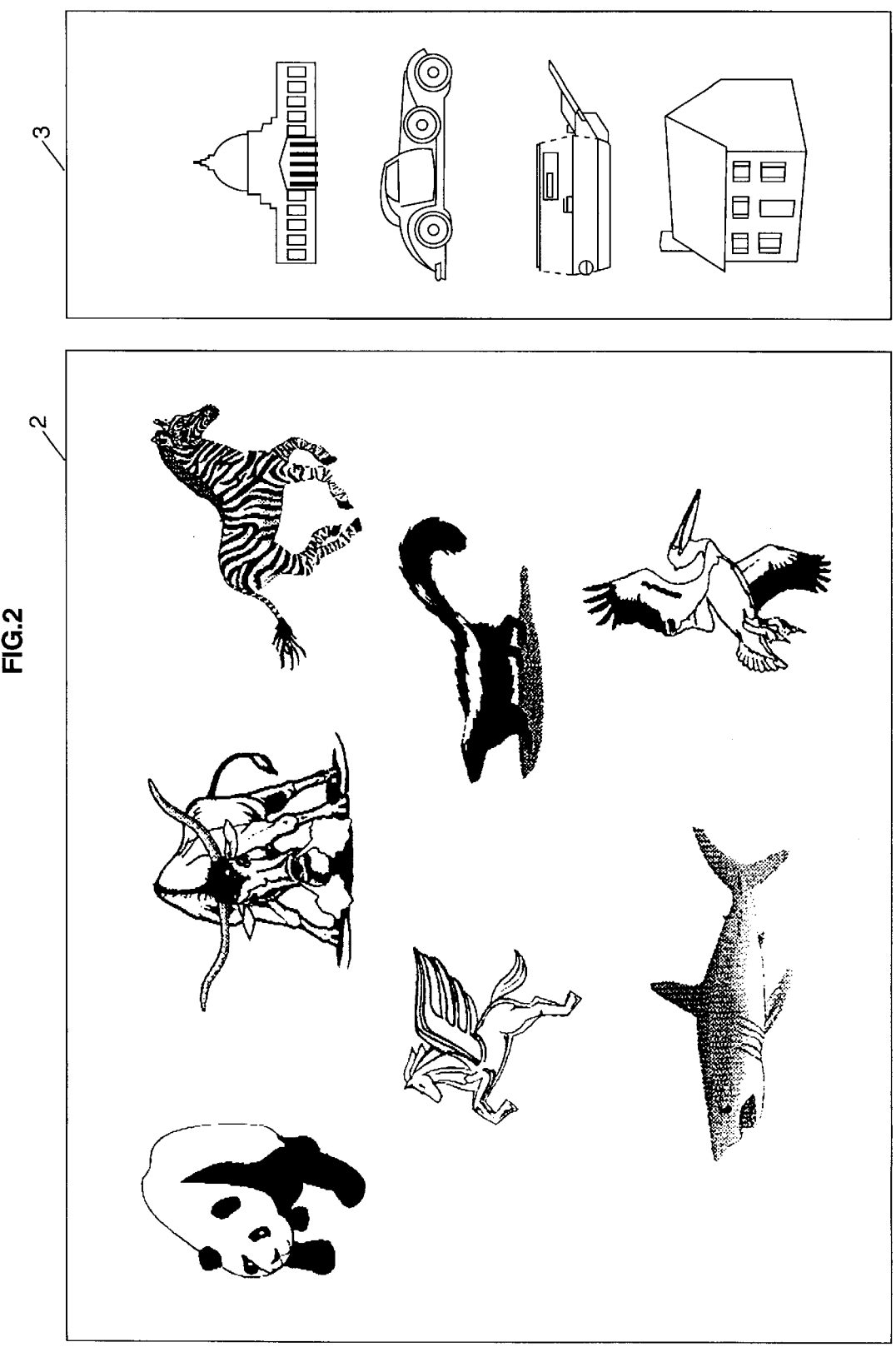
FIG. 2 illustrates another user interface display from that shown in FIG. 1 and in which simplified controls and data objects for an adolescent or infant human user are depicted.

Returning to FIG. 2, an example file which a child browses might be identified by the URL http://www.kids.com/animals.html, a web page of animals which, when selected, produce appropriate animal sounds. Such an embodiment is shown in FIG. 2 which may be contrasted with FIG. 1 in which a normal adult or parent browser user interface is shown. In FIG. 1, a display screen 1 has two primary areas, the data display zone 2, shown within the dotted line, and the user interface control area 3, which is everything else shown outside of the dotted line, not just the bracketed control icons shown in the Figures. A scroll control 4 of the type normally encountered is also shown and this is viewed more as a generic user interface control but can be associated as part of the controls in FIG. 3 and removed, as shown by the substitution of the new interface control 3 in FIG. 2. In FIG. 2, the display area 2 contains the animal graphics from the HTML file noted above, but the user interface controls are depicted and located within zone 3 in a fashion that might be understood by a preschool child.

Continuing with the example given, the parent may be browsing the news with the standard user interface as shown in FIG. 1. The browser may be currently viewing the URL http://www.news.com. A child may then approach the parent and then ask to be allowed to browse the animals page. To accomplish this, the parent uses the browser's bookmark list to request the URL content http://www.kids.com/animals.html. And the browser will request the content of this URL from the Web. The requested contents, an HTML page pointed to by the URL, will arrive from the Web. Referring now to point A in FIG. 4A, the user interface control facility of the preferred embodiment of the invention as implemented in the browser performs the following steps:

In box 70 the new incoming content is received and in box 71 a check is made as to whether a user interface is registered for this type of file. If the answer is yes, the question is asked in box 76 whether the registered user interface is already active and if it is, operation passes directly to showing the new data content using the existing user interface. It may be noted that several types of tests are made. In box 71 the file type is checked to see if it is registered. If the answer is no, then in box 72 the content type is checked for registration. If the answer is yes, operation proceeds with the yes from box 71. If the answer is no, a check is made in box 73 for whether a user interface is registered for data of this data object type. If the answer is yes, operation proceeds as already described, but if the answer is no, a check is made in box 74 to determine if the user interface is registered for the file name that has been received. If the answer is yes, operation proceeds as already given and if it is no, then the present user interface is used and the new content is shown in it as shown in box 75. If a new user interface is detected as being requested and has been registered, then any one of the tests in boxes 71–74 will result in a yes and operation will proceed to B in FIG. 4B where, in box 77, the user interface change control facility will hold all of outstanding URL content requests presented for the currently active user interface, or, if a user has requested a change in the user interface via box 78, the same thing will be done. In box 79, the currently active user interface activity will be suspended when an appropriate point in its operation from which it can be resumed has been reached. In box 80, it is determined whether this request is the first time that the new user interface being requested is being activated. If the answer is no, the user interface is resumed from the point where it was suspended in box 79 as is shown in box 83 and operation continues to check in box 85 from box 83 as to whether there are any more queued content requests which will then be passed in sequence through the operation of box 86 to the new user interface, and then the process ends in block 87.

If this is the first time in block 80 that the new user interface has been activated, then box 81 is activated to inquire whether the new interface needs to be loaded. If the new interface is to be loaded, block 82 loads the user interface and proceeds to block 84 where the user interface is started. From there, operation continues through blocks 85, 86 and 87 as already discussed.

Returning to this specific example concerning the child's request to browse the animals page and returning to the flowchart FIG. 4A, the browser will determine that no user interface is registered for the file type .html (for example), that no user interface is registered for the text type content HTML, that no user interface is registered for the HTML data type, but that the child user interface is registered for the file http://www.kids.com/animals.html. The browser will then find in the flowchart FIG. 4A that the child's requested, registered user interface is not currently active. Referring then to point B in flowchart 4B, the browser prepares to switch to a new user interface by holding all outstanding URL content requests, suspending the current user interface, the standard user interface that was depicted in FIG. 1. The browser, implemented with the user interface control facility of the present invention depicted in the flowcharts, will then determine that this is the first time that the child user interface needs to be loaded and will proceed to load that interface from storage either from a local file or from the World Wide Web itself from a location previously indicated in storage as the location for accessing the requested user interface specification controls. The interface change control facility will initialize the child's user interface, giving the browser the opportunity to perform any initialization function specific to the user interface required. The browser will then determine there are no current requests to pass on to the child user interface and will await input from the interface.

Figure 3:
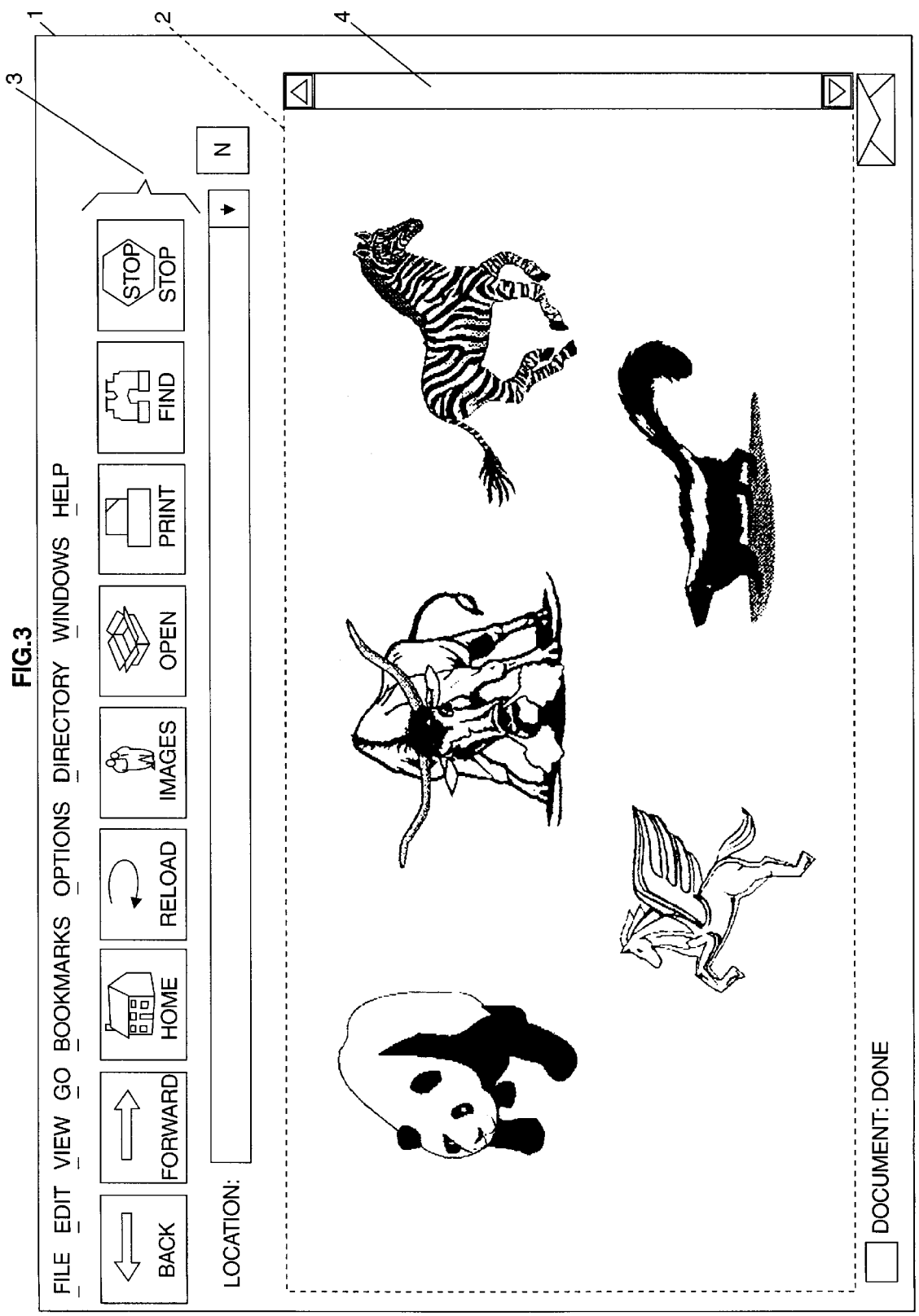
FIG. 3 illustrates another view of operation of the preferred embodiment of the invention in which the user interface as shown in FIG. 1 has been applied to the data objects and elements from FIG. 2.

From this point, the screen of the display appears as shown in FIG. 2. When the child begins to use the computer, and will interact with that interface 3 until done. When the child does leave the computer, the parent may type the key sequence for switching back to the standard user interface or, if provided, could click on an icon for returning automatically to the standard user interface. This is shown beginning at point C of the flowchart FIG. 4B wherein, the user interface control facility as implemented in a browser for the present invention takes the following steps:

The facility prepares to switch to a new user interface by holding all outstanding contents in a queue and suspending the current interface which was the child interface of FIG. 2. The user interface control will determine that this is not the first time that the standard user interface has been activated and will therefore resume the standard user interface from the point where it was suspended previously. The control facility will then determine if the standard interface may or may not have contents to pass to it and the screen will appear as shown in FIG. 3. Note that the standard user interface is now active as shown by the numeral 3, and that the same user interface as was shown in FIG. 1 is now appearing in conjunction with the data content window 2 (which still contains the child's data content from FIG. 2). This demonstrates that the user interface 3 and the content 2 are separate entities and that any content can be processed by any given user interface, since user interfaces are only associated with specific content within the registry maintained in the user interface control facility of the browser as implemented in the present invention.

Having thus described our invention with reference to a preferred embodiment thereof, which has been illustrated as embodied in a browser application program, it will be apparent to those skilled in the art that the essential interface format change requests can be control signals as easily recognized by an operating system, a display presentation control system, or a host control system supporting any type of computer apparatus in any of the environments noted, without departing from the essential concepts and spirit of the invention so long as the control processes which operate the user interface controls and display are separated from those which display data content on the display screen. This is normally the case with structured data input which is normally structured in accordance with agreed conventions. Some prior art systems have the display format and control so integrated with the data stream for presentation, that true separation may be difficult. Nevertheless, detection of appropriate indicia in such a formatted data stream could be used to override or rewrite the data stream to place appropriate format controls in it and achieve the result of the present invention. Therefore, what is set forth in the claims which follow, and which are desired to be protected by letters patent, is by way of description and not of limitation.

What is claimed is:

1. A computer system comprising a processor, a memory, a display and input/output or interface means, together with interconnecting communication means for connecting said processor, memory, display and input/output means, and further comprising:

means for detecting that a user interface presentation format change is desired and, responsive to said detecting, means for determining if a new one of a plurality of user interface presentation formats is desired; and responsive to said determining, means for loading said desired user interface presentation format into said memory for use by said processor in displaying said desired interface on said display registry means for holding specified criteria for comparison to content received for presentation on said display means and, responsive to said comparison, for selecting a predefined user interface presentation.

2. A computer as claimed in claim 1, wherein said means for determining further comprises:

means responsive to a received user request for an identified desired user interface format change, for determining if said user request identifies a new user interface format that requires loading into said memory, and if not, resuming operation with the user interface in use once said user request was received.

3. A computer system as claimed in claim 1, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

4. A computer system as claimed in claim 2, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

5. A computer system as claimed in any one of claims 1, 2, 3 or 4, wherein:

incoming data for display is analyzed to determine if it identifies a previously activated user interface presentation control format, and, if it does, resuming operation of said previously activated user interface presentation control format.

6. A computer system as claimed in any one of claims 1, 2, 3 or 4, and further including a network browser application loaded into said memory and being executed by said processor, wherein said browser further comprises:

means for detecting that a user interface presentation format change is desired and, responsive to said detecting, means for determining if a new one of a plurality of user interface presentation control formats is desired; and responsive to said determining, means for loading said desired user interface presentation format into said memory for use by said processor in displaying said desired interface on said display.

7. A computer system as claimed in claim 6, wherein said means for detecting a desired user interface format change further comprises:

registry means for holding specified criteria for comparison to content received for presentation on said display means and, responsive to said comparison, for selecting a predefined user interface presentation control format.

8. A computer system as claimed in claim 6, wherein said means for determining further comprises:

means responsive to a received user request for an identified desired user interface format change, for determining if said user request identifies a new user interface format that requires loading into said memory, and if not, resuming operation with the user interface in use once said user request was received.

9. A computer system as claimed in claim 7, wherein said means for determining further comprises:

means responsive to a received user request for an identified desired user interface format change, for determining if said user request identifies a new user interface format that requires loading into said memory, and if not, resuming operation with the user interface in use once said user request was received.

10. A computer system as claimed in claim 6, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

11. A computer system as claimed in claim 7, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

12. A computer system as claimed in claim 8, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

13. A computer system as claimed in claim 9, wherein said means for detecting further comprises:

means for monitoring incoming data for presentation on said display; and said means for determining further comprises means for analyzing said incoming data for the presence of an URL data format identifier of any of the source file name, content type, source file extension, or data object type.

14. A user interface presentation control facility for use in a computer system having at least a processor and a memory and a display in communication with said processor, said control facility comprising a machine readable medium bearing processor instructions, comprising steps executable by said processor for:

detecting that a user interface presentation format change is desired and, responsive to said detecting;

determining if a new one of a plurality of user interface presentation formats is desired; and responsive to said determining, loading said desired user interface presentation control format into said memory for use by said processor in displaying said desired interface controls on said display comparing specified criteria to content received for presentation on said display and, responsive to said comparing, selecting a predefined user interface presentation format for use.

15. A user interface presentation control facility as claimed in claim 14, wherein said determining step further comprises:

determining if said user request identifies a new user interface format that requires loading into memory and, if not, resuming operation with the user interface in use when the said user request was received.

16. A user interface presentation control facility as claimed in claim 14, further comprising steps for:

monitoring incoming data for presentation on said display; and said determining step further comprises steps for analyzing said incoming data for the presence of an URL data format identifier of any of the source file name, content type, source file extension, or data object type exists.

17. A user interface presentation control facility as claimed in claim 15, further comprising steps for:

monitoring incoming data for presentation on said display; and said determining step further comprises steps for analyzing said incoming data for the presence of an URL data format identifier of any of the source file name, content type, source file extension, or data object type exists.

18. A presentation control facility as claimed in any one of claims 14, 15, and 16, further comprising steps executable in said processor for:

analyzing incoming data to determine if it identifies a previously activated user interface presentation format, and if it does, resuming operation of said previously actuated user interface presentation format.

19. In a computer system, a method of controlling a user interface format display comprising steps of:

detecting that a user interface presentation format change is desired and, responsive to said detecting, determining if a new one of a plurality of user interface presentation formats is desired; and responsive to said determining, loading said desired user interface presentation format into said memory for use by said processor in displaying said desired interface on said display holding specified criteria for comparison to content received for presentation on said display and, responsive to said comparison, selecting a predefined user interface presentation format.

20. A method as claimed in claim 19, wherein said determining further comprises determining if said user request identifies a new user interface format that requires loading into memory and if not, resuming operation with the user interface in use when said user request was received.

21. A method as claimed in claim 19, further comprising steps for:

monitoring incoming data for presentation on said display; and determining by steps comprising steps for analyzing said incoming data for the presence of an URL data format identifier of any of the source file name, content type, source file extension, or data object type exists.

\* \* \* \* \*